United States Patent
Raviv et al.

(10) Patent No.: US 7,184,764 B2
(45) Date of Patent: Feb. 27, 2007

(54) METHOD AND APPARATUS FOR SUPPORTING CELLULAR DATA COMMUNICATION TO ROAMING MOBILE TELEPHONY DEVICES

(75) Inventors: Li-On Raviv, Petah-Tikva (IL); Carmel Sofer, Mevaseret Zion (IL); Shlomo Wolfman, Hod Hasharon (IL); Ory Biran, Kiryat Tivon (IL)

(73) Assignee: StarHome GmbH, Zurich (CH)

(*) Notice: Subject to any disclaimer, the term of this patent is extended or adjusted under 35 U.S.C. 154(b) by 489 days.

(21) Appl. No.: 10/067,536

(22) Filed: Feb. 7, 2002

(65) Prior Publication Data

US 2002/0164983 A1    Nov. 7, 2002

(51) Int. Cl.
*H04Q 7/20* (2006.01)

(52) U.S. Cl. .................... 455/432.1; 455/466; 455/403

(58) Field of Classification Search ................ 455/403, 455/422.1, 432.1, 432.3, 433, 435.2, 438, 455/439, 406, 466, 432
See application file for complete search history.

(56) References Cited

U.S. PATENT DOCUMENTS

| | | | |
|---|---|---|---|
| 5,497,412 A * | 3/1996 | Lannen et al. ............ 455/432.2 |
| 5,862,203 A | 1/1999 | Wulkan et al. |
| 6,028,838 A | 2/2000 | Yamamura et al. |
| 6,088,431 A * | 7/2000 | LaDue ..................... 379/114.2 |
| 6,091,949 A * | 7/2000 | Sanchez ...................... 455/417 |
| 6,119,001 A * | 9/2000 | Delis et al. ................. 455/433 |
| 6,148,197 A | 11/2000 | Bridges et al. |
| 6,167,250 A | 12/2000 | Rahman et al. |
| 6,330,444 B1 * | 12/2001 | Rune et al. .................. 455/433 |
| 6,377,804 B1 * | 4/2002 | Lintulampi .............. 455/435.2 |
| 6,411,807 B1 * | 6/2002 | Amin et al. ............. 455/432.3 |
| 6,628,942 B1 * | 9/2003 | Beming et al. .......... 455/432.1 |
| 6,643,511 B1 * | 11/2003 | Hu et al. ..................... 455/433 |
| 6,690,798 B1 * | 2/2004 | Dent .......................... 380/248 |
| 6,691,164 B1 * | 2/2004 | Hundscheidt et al. ....... 709/225 |
| 6,735,429 B1 * | 5/2004 | Adamany et al. ........... 455/410 |
| 6,771,971 B2 * | 8/2004 | Smith ....................... 455/456.1 |
| 6,779,025 B1 * | 8/2004 | Wolfe et al. ................ 709/219 |
| 6,925,288 B2 * | 8/2005 | McDonnell et al. ........ 455/41.2 |
| 2001/0020242 A1 * | 9/2001 | Gupta et al. ............. 707/501.1 |
| 2002/0085701 A1 * | 7/2002 | Parsons et al. ......... 379/211.01 |
| 2004/0224680 A1 | 11/2004 | Jiang |
| 2005/0070278 A1 | 3/2005 | Jiang |
| 2005/0186950 A1 | 8/2005 | Jiang |

FOREIGN PATENT DOCUMENTS

CA    2305970    7/2000

(Continued)

*Primary Examiner*—CongVan Tran

(57) ABSTRACT

A cellular data communication interfacing apparatus, for association with a mobile network and for supporting cellular data communication to roaming mobile telephony devices, comprises a data request analyzer, a service network selector, and an interfacing engine. Each of the roaming telephony devices is associated with a respective home network and a service profile specifying service networks providing data services to the device. The data request analyzer analyzes data requests from the roaming mobile. The service network selector uses the request analyses together with the device service profiles to select a corresponding service network. The interfacing engine introduces the devices to the service networks, directs the data requests to the service networks, and directs the corresponding data responses from the service networks to the requesting roaming mobile devices.

28 Claims, 6 Drawing Sheets

FOREIGN PATENT DOCUMENTS

| | | |
|---|---|---|
| DE | 19742681 | 4/1999 |
| EP | 0952539 | 10/1999 |
| WO | WO 98/20698 | 5/1998 |
| WO | WO 98/47295 | 10/1998 |
| WO | WO 98/59503 | 12/1998 |
| WO | WO 99/04582 | 1/1999 |
| WO | WO 01/43361 | 6/2001 |
| WO | WO 2004/014101 | 2/2004 |
| WO | WO 2004/075484 | 2/2004 |
| WO | WO 2004/075579 | 2/2004 |
| WO | WO 2004/075598 | 2/2004 |
| WO | WO 2005/017693 | 2/2005 |
| WO | WO 2005/018245 | 2/2005 |
| WO | WO 2005/081962 | 9/2005 |
| WO | WO 2005/086927 | 9/2005 |

\* cited by examiner

METHOD AND APPARATUS FOR SUPPORTING CELLULAR DATA COMMUNICATION TO ROAMING MOBILE TELEPHONY DEVICES

TITLE OF THE INVENTION

A method and apparatus for supporting cellular data communication to roaming mobile telephony devices

FIELD OF THE INVENTION

The present invention relates to roaming cellular data communication and more particularly but not exclusively to wireless application protocol (WAP) data communication.

BACKGROUND OF THE INVENTION

Two of the most dynamic and fastest growing technologies in recent years are wireless communications and the Internet. Wireless access to the Internet is currently available from mobile telephones and from laptop computers, and is being developed for other mobile devices such as personal digital assistants (PDAs). The WAP (and i-mode technology) is a leading contender to provide wireless access to data networks. However there are currently numerous limitations to WAP data access.

FIG. 1 illustrates the difference between typical WAP architecture and the client server model. Under the client server web architecture model, the client 110 and web server 112 are linked directly by the network. Under typical WAP architecture, a WAP gateway 122 located between the access server 124 and the network server 126 functions as a proxy gateway. The WAP gateway 122 implements the WAP conversion functionality, converting non-secure data requests from binary wireless session protocol (WSP) to text WSP. Although this proxy is physically static, WAP application servers 124 may be located elsewhere, closer to the mobile terminal.

In a roaming scenario further limitations arise. Currently WAP roaming is based on a WAP gateway proxy at the home network site. FIG. 2 shows the typical WAP/circuit switched data (CSD) roaming architecture. The mobile unit, such as a WAP phone 210, is located in a visited public mobile network (VPMN). Network access is provided to the WAP phone 210 by a WAP gateway 212 physically located in the WAP phone 210's home public mobile network (HPMN). The WAP phone 210 is preconfigured to place a mobile operator CSD call according to the setup burned into it during production or by the network operator. A typical setup includes the following parameters:

| | |
|---|---|
| Dial-up Number: | +4113806777 |
| User Name: | star |
| Authentication type: | Normal |
| Password: | home |
| Homepage: | http://wap.starhome.com |
| IP Address: | 190.190.10.170 |
| IP Port: | 9201 |
| Bearer: | Data |
| Data call speed: | 9600 |
| Connection type: | Temporary |
| Connection Security: | Off |
| Inactive/idle timeout: | 300 |
| Response time: | 150 |
| Dial type: | ISDN |
| Show images: | Yes |

The call flow begins with an international data telephony connection initiated by a user agent such as a Mobile Switching Center (MSC) 214, to the dial-up number. After an optional authentication phase, the user receives a dynamically allocated HPMN private Internet protocol (IP)address from the Remote Access Server (RAS) 216 or from the Remote Authentication Dial-In User Service (Radius) server located in the home network. A Radius server is an authentication and accounting system used by many Internet Service Providers (ISPs). Radius is an unofficial standard used by many authorization servers to check that users accessing data services via ISPs have provided accurate information and to authorize device access to ISP systems.

Once the session is created, a Radius accounting packet is sent from the RAS 216 to the WAP gateway 212. This packet includes the dynamically allocated IP address and the user Mobile Station International Subscriber Directory Number (MSISDN). The user is recognized in the system in this phase. At the same time, the user agent receives its given IP address back at the phone and starts initiating requests.

Routing the call through the home network is costly to the user, as the roaming data user is obliged to pay long distance or international telephony charges in addition to any other charges for data services. However, in most cases, even that simple yet costly configuration does not work because digital calls are not supported internationally, whilst digital calls are the default setup for WAP access. Another difficulty may appear when MSISDN is required for authentication or billing by the RAS 216 or WAP gateway 212 while the calling line identifier (CLI) is not delivered over international links, such as ISUP/SS#7 links.

Additional problems arise when the phone is configured to dial a short code rather than an international number. Operators commonly use this setup for differentiated billing and/or network topology considerations, for example to ensure that users always access the physically closest RAS.

Additional drawbacks of the CSD architecture are inefficient access to data service applications, lower performance of these applications, and relevancy of the provided information. If the content server is local (in the VPMN or geographically close to the VPMN), a so-called tromboning scenario is created. The session is CSD tunneled to the HPMN and, after WAP conversion, returns to the VPMN through the Internet. If the application resides on a third domain, such as an international public land mobile network (IPLMN), the session is routed from the VPMN via the HPMN and then to the IPLMN, instead of directly from the VPMN to the IPLMN. In either case, the information provided to the user is not oriented to visitors and is not updated according to the visitor's current location and needs. In some cases, such as traffic, weather, and local activities, the information may be irrelevant.

General Packet Radio Service (GPRS) mobile operators, while not suffering from the same routing difficulties facing CSD mobile operators, have difficulty providing convenient data service access to their subscribers. Subscribers are routed to a single site, and cannot access a wide variety of data services through the mobile operator.

A need exists for a cellular data communication method that will provide roaming users with seamless access to data services throughout the accessible data network, and which will provide roaming users with relevant information based on both their current location and home network. The method should also ensure that the data communication is efficiently routed.

SUMMARY OF THE INVENTION

According to a first aspect of the present invention there is thus provided an interfacing apparatus, for association with a first mobile network and for supporting cellular data communication to roaming mobile telephony devices, the roaming telephony devices being associated with respective home networks and with respective service profiles specifying service networks providing data services to the device, the apparatus comprising: a data request analyzer, for analyzing requests for data services from the roaming mobile devices, a service network selector associated with the data request analyzer, for using the request analyses together with respective service profiles to select a corresponding service network, and an interfacing engine associated with the service network selector, for introducing the roaming mobile devices to the identified service networks, for directing the data requests to network servers of the service networks, and for directing corresponding data responses from network servers of the service networks to the requesting roaming mobile devices.

Preferably, the data communication comprises circuit switched data (CSD) communication.

Preferably, the data communication comprises General Packet Radio Service (GPRS) communication.

Preferably, the interfacing apparatus has a link to a supporting interfacing apparatus on at least one of the service networks.

Preferably, the mobile device comprises one of a group comprising: a mobile telephone, a portable computer, and a personal digital assistant (PDA).

Preferably, one of a group of devices comprising: wireless application protocol (WAP), MHTML, CHTML, and SHTML devices.

Preferably, the mobile device is operable to perform CSD communication.

Preferably, the data request analyzer comprises: a device identifier, for identifying from at least one parameter received with a data request from the mobile device a respective identity of the mobile device and a data service determiner for determining from at least one parameter received with the data request a respective data service requested by the mobile device.

Preferably, the interfacing engine comprises: an introducer, for introducing the mobile device to the selected service network, and a data communication manager, for managing data communication between the mobile device and network servers.

Preferably, data communication between the mobile device and a service network which allocates a private network address are performed with network address translation, and wherein data communication between the mobile device and a service network which does not allocate a private network address are performed without network address translation, and wherein the interfacing engine further comprises a network address translator comprising: a visited network address determiner, for determining a visited network address allocated to a mobile device by the first mobile network, a service network address determiner, for determining a service network address allocated to the mobile device by the service network, and a readdresser, for replacing an originating network address of a data request with the service network address and for replacing a destination network address of a data response with the visited network address.

Preferably, the service network selector comprises a service profile locator for using the respective identity to locate the respective service profile.

Preferably, the device identifier is operable to identify the device from at least one of the following group of parameters: Mobile Station International Subscriber Directory Number (MSISDN), mobile device home page, access point name (APN), and calling line identifier (CLI).

Preferably, the service network selector is further operable to select the corresponding service network according to an identity of the interfacing apparatus.

Preferably, the service network selector is further operable to select the corresponding service network according to a current location of the device.

Preferably, the service network selector is further operable to identify a service network authorization server.

Preferably, the introducer is further operable to query the service network authorization server to authorize the data service request.

Preferably, the introducer is further operable to perform accounting functions.

Preferably, the device identifier further comprises a home network identifier to identify a respective home network of the mobile device.

Preferably, the home network identifier is operable to identify the respective home network from at least one of the following group of parameters: MSISDN, mobile device home page, APN, and CLI.

Preferably, the device identifier is further operable to identify a home authorization server associated with the respective home network of the device.

Preferably, the introducer is further operable to query the home authorization server to authenticate the mobile communication device.

Preferably, the service network authorization server comprises a Radius server.

Preferably, the interfacing apparatus further comprises a visitor database for storing properties associated with the mobile device.

Preferably, at least some of the properties comprise the service profiles.

Preferably, the service network selector is operable to use service profile information from the database.

Preferably, the properties comprise at least one of the following group of properties: visited network name, visited network location, home network address, visited network address, service network address, community profiles, and a user profile.

Preferably, the service profile comprises a user profile associated with the device.

Preferably, the user profile comprises user specified data service networks.

Preferably, the data communication manager comprises a session manager operable to create and terminate a data communication session.

Preferably, the data communication manager comprises a network address allocater for allocating a visited network address to the mobile device.

Preferably, the data communication manager is further operable as a router.

Preferably, the data communication manager is further operable to perform location and identity based routing of the data communication.

Preferably, the data communication manager comprises a quality of service manager for managing quality of service.

Preferably, the data communication manager comprises a billing manager for managing billing.

Preferably, the data communication manager comprises a network protocol converter for converting a network protocol of the data communication between Wireless Transaction Protocol (WTP) and HyperText Transfer Protocol (HTTP).

Preferably, the data communication manager comprises a network protocol converter for converting a data request having an incompatible protocol into a predetermined network protocol.

Preferably, the data communication manager comprises a telephony protocol converter for converting a preliminary data request having a CSD transport IP protocol to local area network (LAN) IP protocol.

Preferably, the data communication manager comprises a rerouter for rerouting a preliminary data request having a mobile telephony protocol to a mobile telephony node operable to convert the preliminary data request into a data request having a predetermined network protocol and to return the data request to the interfacing apparatus.

Preferably, the mobile telephony protocol comprises CSD and the mobile telephony node comprises a Remote Access Server (RAS).

Preferably, the interfacing apparatus further comprises a mobile device configurer for configuring mobile telephony devices.

Preferably, the mobile device configurer is operable to configure the device with an access code for directing data requests to the interfacing apparatus.

Preferably, the access code comprises one of a group comprising; a WAP short code, an APN, a country code, a corporate code, an identity based code, and a network address.

Preferably, a network server of a service network is located within a corporate network.

Preferably, a network server of a service network is located within a private network.

Preferably, a network server of a service network is located within the Internet.

Preferably, a format of at least one of the data requests comprises one of a group comprising: WAP data, standard data, and secure data.

Preferably, a format of at least one of the data requests comprises IP data.

Preferably, the interfacing apparatus further comprises a visitor portal operable to direct the mobile device to a visitor portal page associated with the device.

Preferably, the visitor portal comprises: a page generator for generating the visitor portal pages, and an interface for directing the devices to the visitor portal pages.

Preferably, the visitor portal is operable to direct the mobile device to the visitor portal page upon initiation of a data session by the device.

Preferably, the visitor portal is operable to generate the associated visitor portal page in accordance with a current location of the device.

Preferably, the current location is determined by parameters associated with the first mobile network.

Preferably, the current location is determined by parameters associated with the interfacing apparatus.

Preferably, the visitor portal is operable to generate the associated visitor portal page in accordance with the first network.

Preferably, the visitor portal is operable to generate the associated visitor portal page in accordance with the respective home network of the device.

Preferably, the visitor portal is operable to generate the associated visitor portal page in accordance with the respective service profile associated with the device.

Preferably, the visitor portal page contains links to at least one of a group comprising: bookmark requests a mobile device home page, a home network page, a first mobile network page, a location based page, an Internet access page, a corporate access page, a search engine, and an e-mail service.

Preferably, the data services comprise at least one of the following group of services: commercial services, emergency services, email, native language customer assistance, global short code access, bookmark access, and short message service.

Preferably, the selected service network comprises the first mobile network.

Preferably, the selected service network comprises a respective home mobile network of the mobile device.

According to a second aspect of the present invention there is thus provided a mobile cellular communication device having a home cellular network and being able to roam other networks, the mobile device being associated with a service profile specifying service networks providing data services to the device, wherein the mobile device is configured to direct roaming data communications whilst roaming a respective one of the other networks to a preselected data interface of the respective network, thereby to make connections to user-selected data services, the interface being selected to analyze requests for data services from the mobile device, to use the request analyses together with the service profile to select a corresponding service network, to introduce the mobile device to the identified service networks, to direct the data requests to network servers of the service networks, and to direct corresponding data responses from network servers of the service networks to the mobile device.

Preferably, the data communication comprises CSD communication.

Preferably, the data communication comprises GPRS communication.

Preferably, the configuration is enterable at manufacture of the device.

Preferably, the configuration is enterable enterable upon roaming access to a network.

Preferably, the configuration is remotely applicable.

Preferably, a configuration of the device is remotely entered by the respective network, thereby to enable the device to direct roaming data communications to the data interface upon logon of the device to the respective network.

Preferably, the device is configured with a predetermined access code for directing data requests to the interfacing apparatus.

Preferably, the mobile device is operable to direct the data requests to the interface by outputting a predetermined access code.

Preferably, the predetermined access code comprises one of a group of codes comprising: a predetermined access address, a predetermined APN, a WAP short code, a country code, a corporate code, an identity based code, and a network code.

Preferably, the mobile device comprises one of a group comprising: a mobile telephone, a portable computer, and a PDA.

Preferably, mobile cellular communication further comprises support for a WAP compatible device.

Preferably, the WAP compatible device comprises one of a group of devices comprising: WAP, MHTML, CHTML, and SHTML devices.

Preferably, mobile cellular communication comprises functionality to perform CSD communication.

According to a third aspect of the present invention there is thus provided a network having home mobile devices and able to allow connections with non-home mobile devices, the network having a data interface for supporting data communication involving the non-home devices, the non-home devices being associated with respective home networks and with respective service profiles specifying service networks providing data services to the non-home devices, the data interface comprising: a data request analyzer, for analyzing requests for data services from the non-home mobile devices, a service network selector associated with the data request analyzer, for using the request analyses together with respective service profiles to select a corresponding service network, and an interfacing engine associated with the service network selector, for introducing the non-home mobile devices to the identified service networks, for directing the data requests to network servers of the service networks, and for directing corresponding data responses from network servers of the service networks to the requesting non-home mobile devices.

Preferably, the data communication comprises CSD communication.

Preferably, the data communication comprises GPRS communication.

Preferably, the interface has a link to a supporting interface on at least one of the service networks.

Preferably, the data request analyzer comprises: a device identifier, for identifying from at least one parameter received with a data request from the non-home mobile device a respective identity of the non-home mobile device, and a data service determiner for determining from at least one parameter received with the data request a respective data service requested by the non-home mobile device.

Preferably, an introducer, for introducing the non-home mobile device to the selected service network, and a data communication manager, for managing data communication between the respective device and network servers.

Preferably, data communication between the respective mobile device and a service network which allocates a private network address are performed with network address translation, and wherein data communication between the respective mobile device and a service network which does not allocate a private network address are performed without network address translation, and wherein the interfacing engine further comprises a network address translator comprising: a visited network address determiner, for determining a visited network address allocated to a respective non-home mobile device by the network, a service network address determiner, for determining a service network address allocated to the respective mobile device by the service network, and a readdresser, for replacing an originating network address of a data request with the service network address and for replacing a destination network address of a data response with the visited network address.

Preferably, the data service determiner is further operable to identify a service network authorization server.

Preferably, the introducer is further operable to query the service network authorization server to authorize the data service request.

Preferably, the data interface further comprises a visitor database for storing properties associated with the respective mobile device.

Preferably, at least some of the properties comprise the service profiles.

Preferably, the device identifier is operable to identify the mobile device from at least one of the following group of parameters: MSISDN, mobile device home page, APN, and CLI.

Preferably, the data communication manager comprises a session manager operable to create and terminate a data communication session.

Preferably, the data communication manager is further operable as a router.

Preferably, the data communication manager is further operable to perform location and identity based routing of the data communication.

Preferably, the data communication manager comprises a quality of service manager for managing quality of service.

Preferably, the data communication manager comprises a billing manager for managing billing.

Preferably, the data communication manager comprises a network protocol converter for converting between WTP and HTTP.

Preferably, the data communication manager comprises a network protocol converter for converting a data request having an incompatible protocol into a predetermined network protocol.

Preferably, the data communication manager comprises a rerouter for rerouting a preliminary data request having a mobile telephony protocol to a mobile telephony node operable to convert the preliminary data request into a data request having a predetermined network protocol and to return the data request to the data interface.

Preferably the network further comprises a mobile device configurer for configuring mobile telephony devices.

Preferably, the mobile device configurer is operable to configure a mobile telephony device with an access code for directing data requests to the interfacing apparatus.

Preferably, the data interface further comprises a visitor portal operable to direct the mobile device to a visitor portal page associated with the device.

Preferably, the visitor portal comprises: a page generator for generating the visitor portal pages, and an interface for directing the devices to the associated visitor portal pages.

Preferably, the visitor portal is operable to generate the associated visitor portal page in accordance with at least one of the following: a service profile associated with the device, a respective home network of the device, the network, and a user profile associated with the device.

Preferably, the visitor portal is operable to direct the respective mobile telephony device to the visitor portal upon initiation of a data session by the device.

Preferably, the visitor portal page contains links to at least one of a group comprising: bookmark requests, a respective device home page, a home network page, a network page, a location based page, an Internet access page, a corporate access page, a search engine, and an e-mail service Preferably, the data services comprise at least one of the following group of services: commercial services, emergency services, email, native language customer assistance, global short code access, bookmark access, and short message service.

According to a fourth aspect of the present invention there is thus provided a system for supporting roaming data communication, the system comprising a network having home users and non-home users and a data interface, the interface is operable to support data communication between one of the non-home users having a roaming mobile device and a requested data service, the roaming mobile device is associated with a home network and with a service profile specifying service networks providing data services to the device, wherein the interface comprises: a data request analyzer, for analyzing requests for data services from the mobile device, a service network selector associated with the data request analyzer, for using the request analyses together with the service profile to select a corresponding service network, and an interfacing engine associated with the service network selector, for introducing the mobile device to the identified service networks, for directing the data requests to network servers of the service networks, and for directing corresponding data responses from network servers of the service networks to the mobile devices.

Preferably, the data communication comprises CSD communication.

Preferably, the data communication comprises GPRS communication.

Preferably, the interface has a link to a supporting interface on at least one of the service networks network.

Preferably, the data request analyzer comprises:

a device identifier, for identifying from at least one parameter received with a data request from the roaming mobile device a respective identity of the roaming mobile device, and a data service determiner for determining from at least one parameter received with the data request a respective data service requested by the roaming mobile device.

Preferably, the interfacing engine comprises: an introducer, for introducing the roaming mobile device to the selected service network, and a data communication manager, for managing data communication between the roaming mobile device and network servers.

Preferably, data communication between the roaming mobile device and a service network which allocates a private network address are performed with network address translation, and wherein data communication between the roaming mobile device and a service network which does not allocate a private network address are performed without network address translation, and wherein the interfacing engine further comprises a network address translator comprising:

a visited network address determiner, for determining a visited network address allocated to the mobile device by the network, a service network address determiner, for determining a service network address allocated to the mobile device by the service network, and a readdresser, for replacing an originating network address of a data request with the service network address and for replacing a destination network address of a data response with the visited network address.

Preferably, the service network selector is further operable to identify a service network authorization server of the roaming mobile device.

Preferably, the introducer is further operable to query the service network authorization server to authorize the data communication.

Preferably, the data interface further comprises a visitor database for storing properties associated with the mobile device.

Preferably, at least some of the properties comprise the service profiles.

Preferably, the device identifier is operable to identify the mobile device from at least one of the following group of parameters: MSISDN, mobile device home page, APN, and CLI.

Preferably, the data communication manager comprises a session manager operable to create and terminate a data communication session.

Preferably, the data communication manager is further operable as a router.

Preferably, the data communication manager is further operable to perform location and identity based routing of the data communication.

Preferably, the data communication manager comprises a quality of service manager for managing quality of service.

Preferably, the data communication manager comprises a billing manager for managing billing.

Preferably, the data communication manager comprises a network protocol converter for converting between WTP and HTTP.

Preferably, the data communication manager comprises a network protocol converter for converting a data request having an incompatible protocol into a predetermined network protocol.

Preferably, the data communication manager comprises a rerouter for rerouting a preliminary data request having a mobile telephony protocol to a mobile telephony node operable to convert the preliminary data request into a data request having a predetermined network protocol and to return the data request to the data interface.

Preferably the system further comprises a mobile device configurer for configuring mobile telephony devices.

Preferably, the mobile device configurer is operable to configure a mobile telephony device with an access code for directing data requests to the interfacing apparatus.

Preferably, the data interface further comprises a visitor portal operable to direct the mobile device to a visitor portal page associated with the device.

Preferably, wherein the visitor portal comprises: a page generator for generating the visitor portal page, and an interface for directing the device to the visitor portal page.

Preferably, the visitor portal is operable to generate the visitor portal page in accordance with at least one of the following: a service profile associated with the respective device, a home network of the respective device, the network, and a user profile associated with the device.

Preferably, the visitor portal is operable to direct the respective mobile telephony device to the visitor portal upon initiation of a data session by the device.

Preferably, the visitor portal page contains links to at least one of a group comprising: a roaming mobile device home page, a home network page, a network page, a location based page, an Internet access page, a corporate access page, a search engine, and an e-mail service.

Preferably, the data services comprise at least one of the following group of services: commercial services, emergency services, email, native language customer assistance, global short code access, bookmark access, and short message service.

According to a fifth aspect of the present invention there is thus provided a visitor portal for supporting data communication from roaming mobile telephony devices, the mobile telephony devices being associated with respective home networks and with respective service profiles, and being able to roam non-home networks, the visitor portal comprising: a page generator for generating for the devices respective visitor portal pages according to the service profiles, and an interface for directing the devices to the respective visitor portal pages.

Preferably, at least some of the service profiles comprise a user profile.

Preferably, a user profile comprises user specified data service networks.

Preferably, a non-home network being roamed by a mobile telephony device is operable to connect the mobile telephony device to the visitor portal.

Preferably, the non-home network is operable to connect the mobile telephony device to the visitor portal upon initiation of a data session by the mobile telephony device.

Preferably, the mobile device comprises one of a group of devices comprising: WAP, MHTML, CHTML, and SHTML devices.

Preferably, the mobile devices are operable to perform CSD communication.

Preferably, the mobile devices are operable to perform GPRS communication,

Preferably, a portal page comprises at least one link to a service network.

Preferably, the page generator is operable to generate the respective visitor portal page in accordance with a current location of the device.

Preferably, the current location is determined by parameters associated with a non-home network being roamed by the mobile telephony device.

Preferably, the page generator is operable to generate the respective visitor portal page in accordance with a non-home network being roamed by the mobile telephony device.

Preferably, the page generator is operable to generate the respective visitor portal page in accordance with the home network associated with the device.

Preferably, the visitor portal page contains links to at least one of a group comprising: bookmark requests, a non-home user page, a mobile device home page, a home network page, a location based page, an Internet access page, a corporate access page, a search engine, and an e-mail service.

Preferably, the visitor portal comprises at least one visitor page template, and wherein the page generator is operable to generate a visitor portal page by insertion of information associated with a mobile device into one of the templates.

According to a sixth aspect of the present invention there is thus provided a system for supporting roaming data communication, the system comprising a network having home users and non-home users and a visitor portal for non-home users, the system is operable to connect a non-home user to the visitor portal.

Preferably, the network comprises the visitor portal.

Preferably, the system is operable to connect the non-home user to the visitor portal upon initiation of a data session by the user.

Preferably, the visitor portal is operable to direct the non-home user to a visitor portal page associated with the device.

Preferably, the visitor portal comprises: a page generator for generating for the visitor portal pages, and an interface for directing the non-home user to the associated visitor portal page.

Preferably, the page generator is operable to generate the associated visitor portal page in accordance with a current location of the device.

Preferably, the current location is determined by parameters associated with the first mobile network.

Preferably, the page generator is operable to generate the associated visitor portal page in accordance with the home network of the device.

Preferably, the page generator is operable to generate the associated visitor portal page in accordance with a user profile associated with the device.

Preferably, the visitor portal page contains links to at least one of a group comprising: a non-home user page, a mobile device home page, a home network page, a location based page, an Internet access page, a corporate access page, a search engine, and an e-mail service.

According to a seventh aspect of the present invention there is thus provided a network for supporting roaming of mobile communication devices between at least one mobile network and at least one service network providing data services, each of the mobile communication devices having a respective home network, the network comprising interfacing links to each of the mobile networks and a roaming support unit associated with the interfacing links for providing home data of roaming devices to a respective interfacing link.

Preferably, the network further comprises a database for storing properties associated with the mobile devices, Preferably, the database is further operable to store the home data According to an eighth aspect of the present invention there is thus provided a method for supporting cellular data communication between a mobile telephony device roaming within a first network and having a home network, the mobile telephony device is associated with a service profile specifying service networks providing data services to the device, and a requested data service, the method comprising: receiving a data request for a data service from the mobile device, analyzing the data request to determine the data service and to identify the mobile device, identifying a service profile associated with the identified mobile device, using the request analysis together with the service profile to select a corresponding service network, introducing the mobile device to the service network and forwarding the data request to the service network.

Preferably, the data communication comprises CSD communication.

Preferably, the data communication comprises GPRS communication.

Preferably the method further comprises determining a service network address assigned to the mobile device by the service network.

Preferably the method further comprises:

determining if the service network address comprises a private network address, and if the service network address comprises a private network address, performing network address translation to translate an originating network address of the data request from a visited network address assigned to the mobile device by the first network to the service network address.

Preferably, performing network address translation comprises: determining the visited network address, determining the service network address, and, replacing the originating network address of the data request with the service network address.

Preferably the method further comprises: receiving a data response from a data service, the data response having a destination network address associated with the mobile device, determining if the destination network address comprises a private network address, and if the destination network address comprises a private network address, performing network address translation to translate the destination network address from the service network address to the visited network address, and forwarding the data response to the mobile device.

Preferably, performing network address translation comprises: determining the visited network address, determining the service network address, and replacing the destination network address of the data request with the visited network address.

Preferably the method further comprises identifying a service network authorization server of the mobile device.

Preferably, the service network authorization server comprises a Radius server.

Preferably the method further comprises querying the service network authorization server to authorize the data request by the mobile device.

Preferably the method further comprises identifying a home authorization server of the mobile device.

Preferably the method further comprises querying the home authorization server to authenticate the mobile device.

Preferably the method comprises querying the service network only during initiation of a data session.

Preferably the method comprises querying the home network only during initiation of a data session.

Preferably the method comprises determining an identity of the mobile device from at least one parameter received with the data request.

Preferably the method comprises determining an identity of the device from at least one of the following group of parameters: MSISDN, mobile device home page, APN, and CLI.

Preferably, the mobile device is configurable to provide the at least one parameter.

Preferably the method further comprises allocating a visited network address to the mobile device.

Preferably the method further comprises maintaining a visitor database for storing properties associated with the mobile device.

Preferably, the properties comprise at least one of the following group of properties: visited network name, visited network location, home network address, visited network address, service network address, service profile, and a user profile.

Preferably the method comprises identifying the service profile from the database.

Preferably the method comprises determining an identity of the home network from the database.

Preferably the method further comprises determining the home network address from the database.

Preferably the method further comprises determining the visited network address from the database.

Preferably the method further comprises creating a data communication session for the mobile device.

Preferably the method further comprises terminating a data communication session for the mobile device.

Preferably the method further comprises routing the data communication.

Preferably, the routing is location and identity based.

Preferably the method further comprises managing quality of service.

Preferably the method further comprises managing billing.

Preferably the method further comprises converting a network protocol of the data communication between WTP and HTTP.

Preferably the method further comprises converting a data request having an incompatible protocol into a predetermined network protocol.

Preferably the method further comprises rerouting a preliminary data request having a mobile telephony protocol to a mobile telephony node operable to convert the preliminary data request into a data request having a predetermined network protocol and to return the data request to the data interface.

Preferably, the mobile telephony protocol comprises CSD and the mobile telephony node comprises a RAS.

Preferably, a network server for the data service is located within a corporate network.

Preferably, a network server for the data service is located within a private network.

Preferably, a network server for the data service is located within the Internet.

Preferably, a format of at least one of the data requests comprises one of a group comprising: WAP data, standard data, and secure data.

Preferably the method further comprises connecting the mobile device to a visitor portal page associated with the mobile device.

Preferably the method comprises connecting the mobile device to the visitor portal page upon initiation of a data session by the device.

Preferably the method further comprises generating di associated visitor portal page.

Preferably, the associated visitor portal page is generated in accordance with a current location of the mobile device.

Preferably, the current location is determined by parameters associated with the first mobile network.

Preferably the method comprises generating the associated visitor portal page in accordance with the home network of the device.

Preferably the method comprises generating the associated visitor portal page in accordance with a service profile associated with the device.

Preferably, the service profile comprises a user profile.

Preferably, the visitor portal page contains links to at least one of a group comprising: bookmark requests, a mobile device home page, a home network page, a first mobile network page, a location based page, an Internet access page, a corporate access page, a search engine, and an e-mail service.

Preferably, the mobile device comprises one of a group comprising: a mobile telephone, a portable computer, and a personal digital assistant (PDA).

Preferably the method further comprises configuring the mobile device.

Preferably, the data services comprise at least one of the following group of services: commercial services, emergency services, email, native language customer assistance, global short code access, bookmark access, and short message service.

Preferably, a service network comprises the first mobile network.

Preferably, a service network comprises the home mobile network of the mobile device.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodies in practice. In the accompanying drawings.

DESCRIPTION OF THE PREFERRED EMBODIMENT

Figure 1:
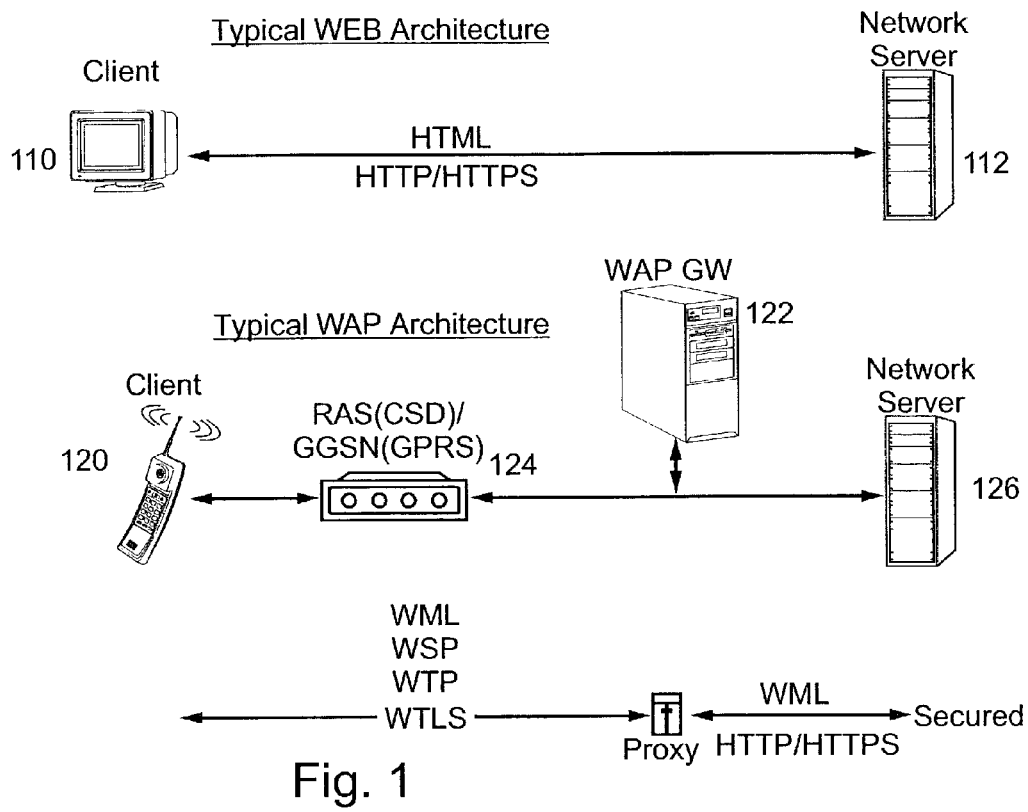
FIG. 1 shows data communication according to the client server model and using typical WAP architecture.
Figure 2:
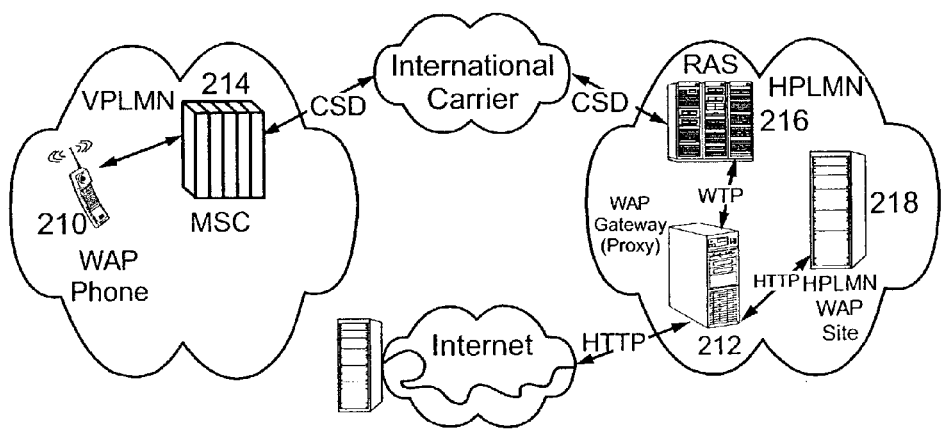
FIG. 2 shows data communication with WAP/CSD roaming architecture.

Current methods for providing data access to mobile telephony users outside their borne networks are inadequate. In most CSD mobile networks today, all data traffic to and from a roaming cellular telephone is routed through, a WAP gateway in the device's home network. In addition to creating a cumbersome, expensive, and generally inefficient routing, this also causes the mobile device to appear to be located within the home network. A user accessing data services through a cell phone may therefore be provided with irrelevant information. Network servers should provide information which is relevant to the user's actual location, while continuing to identify the mobile device correctly in order to provide services the device is authorized to access.

An additional problem facing mobile network operators today is to provide a wide variety of data services to users. These value added services are very important for attracting and maintaining a customer base. Data services, such as commercial services, emergency services, email, native language customer assistance, global short code access, bookmark access, and short message services, are commonly provided to mobile devices. Providing these services to roaming mobile devices can be complex, as a distinction must be made between services that require information from the home network, such as bookmark and email access, and services that require information from local services such as taxi and weather information.

Before explaining at least one embodiment of the invention in detail, it is to be understood that the invention is not limited in its application to the is details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 3:
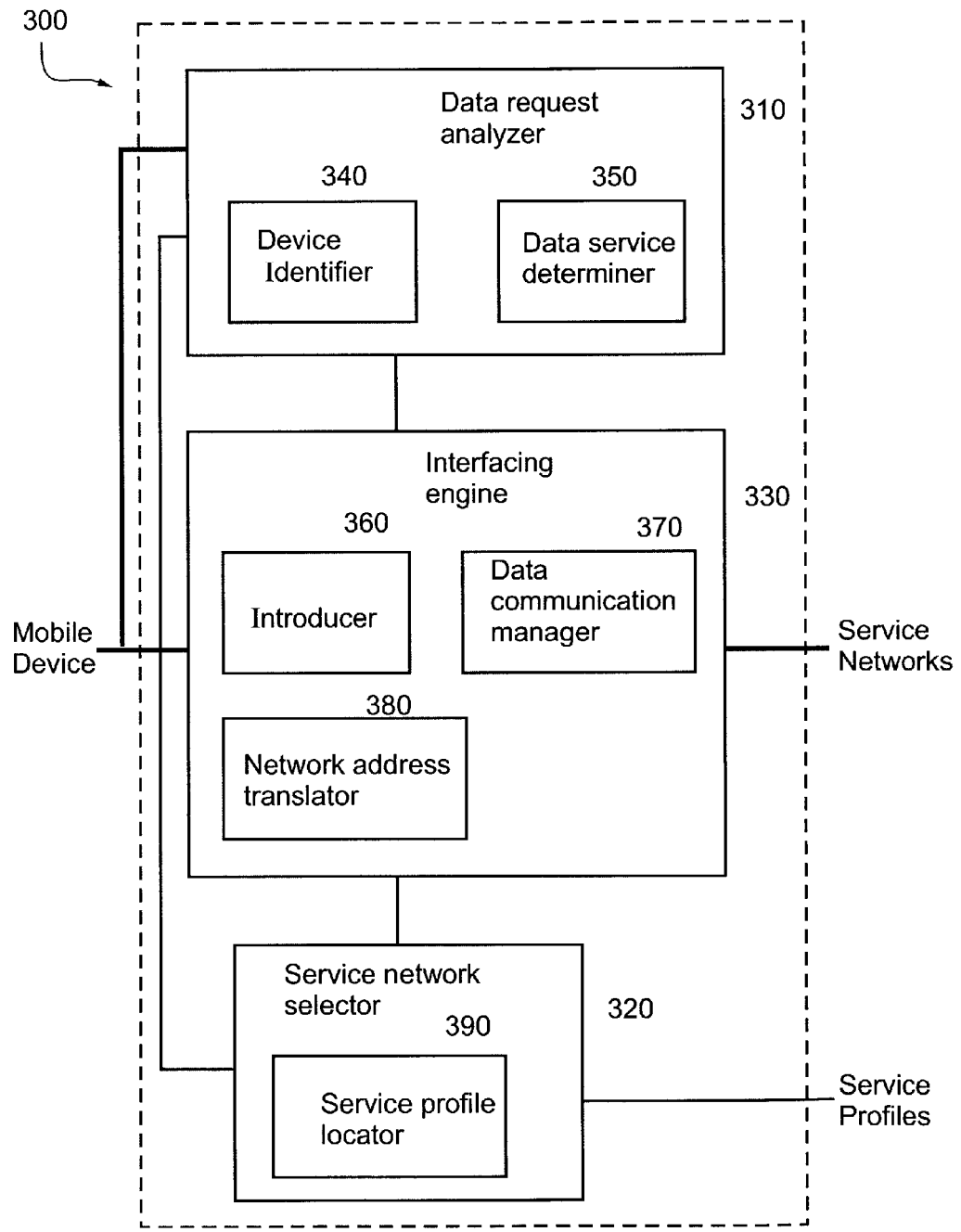
FIG. 3 is a simplified block diagram of a preferred embodiment of a cellular data communication interfacing apparatus for supporting cellular data communication.

Reference is now made to FIG. 3, which is a simplified block diagram of a preferred embodiment of a cellular data communication interfacing apparatus for supporting cellular data communication to one or more roaming mobile telephony devices. Each roaming mobile telephony device is associated with a home mobile network. Each roaming mobile device is also associated with a service profile, which specifies various service networks which provide data services to the mobile device The service profile may include a user profile specifying preferences and information of the mobile device user. The service profile may also include one or more community profiles, listing preferences and information of groups the mobile device user is a part of, such as corporate affiliation or demographic segmentation. Interfacing apparatus 300 comprises data request analyzer 310, which analyzes requests for data services received from the mobile devices, service network selector 320 which selects service networks to provide the requested services to the mobile devices, and interfacing engine 330, which manages data communications between the mobile devices arid the selected service networks. When a data service request is received from a mobile device, the request is analyzed by data request analyzer 310. Then service network selector 320 selects the service network for each data request based on the results of the request analyses performed by the data request analyzer 310 together with the mobile device's service profile. Interfacing engine 330 next introduces the mobile devices to the identified service network, and directs communications between the mobile device and the service network. Interfacing engine 330 forwards data requests from the mobile device to the network servers of the service networks, and directs corresponding data responses from the network servers to the requesting roaming mobile devices. Data services may be provided to the mobile device by the visited network, the device's home network or by a third network having connectivity to the visited network serving die mobile device.

Interfacing apparatus 300 may serve mobile devices having various mobile communication protocols. In one preferred embodiment, the data communication protocol consists of CSD communications. Alternately, data communications may be GPRS communications. Interfacing apparatus 300 may be configured to operate with more than one protocol in parallel. Different preferred embodiments described below are applicable to different technologies, according to technological needs and constraints. The above applies to similar embodiments described below, In the preferred embodiment, interfacing apparatus 300 operates within a mobile telephony network which provides data services to roaming mobile telephony devices. Alternatively, interfacing apparatus 300 may serve several mobile operators. For example, interfacing apparatus 300 may serve as a country gateway that serves all mobile operators of a country. The above applies to similar embodiments described below. The mobile telephony device may be a WAP or WAP compatible device. Such devices include devices using MHTML(MIME (Multipurpose Internet Mail Extensions) Hypertext Markup Language), CHTML(C (Compact) Hyper Text Markup Language), and SHTML(S (Server Side Includes) Hyper Text Markup Language) protocols. In the preferred embodiment the mobile device is CSD mobile device. Mobile devices include mobile telephones, portable computers, and PDAs.

Interfacing apparatus 300 may be located in any place having connectivity to the service networks and to the visited mobile network serving the device. In the preferred embodiment, interfacing apparatus 300 is located in the visited network serving the roaming mobile device. In a further preferred embodiment, an interfacing apparatus 300 is located in both service and visited networks and is linked by a private or public data network. A configuration of interfacing units connected by a private network enables the monitoring and control of data routing, and simplifies the provision of user services such as billing and quality of service management. In an alternate preferred embodiment, the interfacing apparatus 300 is located in a service network.

In the preferred embodiment data request analyzer 310 comprises device identifier 340 and data service determiner 350. An incoming data request to the interfacing apparatus 300 is analyzed by the data request analyzer 310 to extract information and parameters. Device identifier 340 uses data request parameters to identify the device which sent the data request. The parameters used may include: MSISDN, mobile device home page, APN, and CLI. These parameters may be used either separately or in combination to derive the device identity. The data service determiner 350 analyzes the request parameters to determine the requested data service.

The results of the request analyses are utilized by service network selector 320 to determine the service network the data request should be directed to. Service network selector 320 uses the device identity to locate the device's service profile. The service profile indicates the service network which provides the requested service to the device. The service network selector 320 may use additional criteria to select the service network, including the identity of the interfacing apparatus serving the mobile device, and the device location. The above applies to similar embodiments described below. In a preferred embodiment, service network selector 320 comprises a service profile locator which locates the service profile. The service profile may be located anywhere having connectivity to the interfacing apparatus 300, for example within the interfacing apparatus 300, the mobile device, or in a database on the home network, visited network, or any other connected network.

Interfacing engine 330 manages communication between the mobile device and the selected service network. In the preferred embodiment, interfacing engine 330 comprises introducer 360 and data communication manager 370. After service network selector has determined a service network corresponding to a data service request, communications are initiated between the mobile device and the service network when introducer 360 introduces the mobile device to the selected service network.

Data communication manager 370 then manages data communication between the mobile device and the network server. The interfacing engine 330 transmits the data requests from the mobile device to the selected service network servers. Communication need not pass through the home network, and a tromboning scenario is avoided. Data responses from the service network may also bypass the home network and be forwarded to the mobile device by the interfacing apparatus 300.

Some service networks assign private network addresses. When service networks allocate a private network address, network address translation may be necessary to ensure proper data communication. In the preferred embodiment, interfacing engine 330 further comprises a network address translator 380 for performing network address translation. Network address translator 380 comprises a visited network address determiner, a service network address determiner, and a readdresser. Visited network address determiner determines the visited network address allocated to the mobile device. This address is used to direct data responses received from network servers back to the mobile device. In the preferred embodiment, the visited mobile network allocates tire visited network address to the mobile device. In an alternate preferred embodiment the data communication manager 370 comprises a network address allocater for allocating a visited network address to the mobile device. Service network address determiner determines the service network address allocated to die mobile device by the service network. The service network address can be assigned to the mobile device by the interfacing apparatus 300 from a pool of addresses, and sent to the service network authorization server. The readdresser is responsible for performing the address translation on the data requests and responses managed by the interfacing engine. When network address translation is being performed, the readdresser replaces an originating network address of a data request with the device service network address, and replaces a destination network address of a data response with the device visited network address.

Some data services require device authorization or authentication before they may be accessed by a mobile device. In a preferred embodiment, device identifier 340 further comprises a home network identifier to identify the device's home network. Home network identifier identifies the mobile device's respective home network from at least one parameter received with the data request. These parameters may include: the MSISDN, the mobile device home page, APN, and CLI. The home network address may be required in order to correctly identify the device to the home network, for example when requesting authorization or authentication of the roaming device. The home network server may be queried before access is allowed to some home network services and for mobile device authentication.

In a further preferred embodiment, introducer 360 performs data service accounting functions. According to the preferred embodiment, after the service network has been selected introducer 360 defines a data service user. If authorization is required for the data system user, introducer 360 obtains authorization for the user. Once a user is eligible to use a data service, introducer 360 sends a broadcast to the service network. The broadcast may include a list of services the data service user may access. Introducer 360 monitors the data service user activity, and maintains an account for the user. When the data service user closes a data session, introducer 360 sends a corresponding broadcast to the data service network. The accounting records can be used to bill or credit the user for services used during the session, to monitor client activity, and for other account management purposes. The above applies to similar embodiments described below.

In a preferred embodiment, service network selector 320 is further operable to identify a service network authorization server, such as a Radius server, of the mobile communication device. In the preferred embodiment, the introducer 360 is further operable to query the service network authorization server to authorize and/or authenticate the data communication. Authorization and/or authentication may be performed only when a mobile device initiates a data session, or at any time during the data session.

In a preferred embodiment, the interfacing apparatus 300 further comprises a visitor database for storing properties associated with mobile devices roaming within a mobile network. The device service profile may be stored in the database, aid be accessed from the database by the interfacing apparatus 300. Properties that may be stored in the database for a given mobile device include: service profile, visited network name, visited network location, home network address, visited network address, service network address, community profiles, and a user profile for a, user of the device. The database may also store the interfacing apparatus serving the mobile device. When a roaming mobile device logs on to a network, information may be gathered about the device and stored in the database, either for the duration of the session or for a predetermined time period. In the preferred embodiment, the information in the database is used by components of the interfacing apparatus 300, including the service network selector 320 and the network address translator 380, The abovementioned components use the information stored in the database to perform their required functions.

When a data request is received by the interface from a given mobile device the request is analyzed by the data request analyzer 310 to determine the device's identity and the data service requested by the device. The format of the data service request may be one of a group of formats, including: WAP data, standard data, and secure data. In a preferred embodiment the data request format comprises IP data. The service network selector 320 then determines the appropriate service network to provide the data service to the device, based on the device service profile and possibly other factors as described above. If necessary, authorization and/or authentication of the device are obtained from the service and/or home networks. The interfacing engine 330 determines if the service network has assigned a private network address to the device. If a private network address was not assigned to the device, the interfacing engine 330 forwards the data request to the requested service network server with no further processing. The service network server receives a data request from a mobile device having a network address within the visited mobile network and returns its responses accordingly. The interfacing apparatus 300 receives the data response from the network server and forwards it on to the requesting mobile device. If a private network address was assigned to the device, the data request is network address translator by network address translator 380 before being forwarded to the requested service network server. The data request is recognized by the service network as originating from the correct mobile device, and given access to sites and services to which the mobile device is entitled. The reverse process occurs when the interfacing engine 330 receives a data response from a service network server with a private service network address. Interfacing engine 330 replaces the device's service network address with the device's visited network address, and forwards the data response to the roaming mobile device. Typically, the device home network is not part of the data communication pathway.

A requested network server may be located in various locations within the accessible data network. The data service may be accessible via the visited mobile network, the home mobile network, or a third mobile network. Additionally, the network server may be within the Internet, or a private network, such as a corporate network.

In the preferred embodiment the data communication manager 370 comprises further components operable to implement additional interfacing functions. In the preferred embodiment the data communication manager 370 comprises a session manager operable to create and terminate a data communication session.

In the preferred embodiment, the data communication manager 370 is further operable as a router. In a further preferred embodiment, the data communication manager 370 is further operable to perform location and identity based routing of the data communication.

In the preferred embodiment the data communication manager 370 comprises a quality of service manager for managing quality of service (QoS). In a further preferred embodiment the data communication manager 370 comprises a billing manager for managing billing. The quality of service manager and/or billing manager operate in conjunction with the mobile device's quality of service manager, billing manager, and/or Radius server in the home network.

In the preferred embodiment the data communication manager 370 comprises a network protocol converter for converting a data request having an incompatible protocol into a predetermined network protocol. In the preferred embodiment the network protocol converter converts the network protocol of the data communication between Wireless Transaction Protocol (WTP) and HyperText Transfer Protocol (HTTP).

In the preferred embodiment the data communication manager 370 comprises a rerouter for rerouting a preliminary data request having a mobile telephony protocol to a mobile telephony node. The mobile telephony node converts the preliminary data request into a data request having a predetermined network protocol and to return the data request to the interfacing apparatus 300. In one preferred embodiment the rerouter reroutes a CSD data request to an RAS, which converts the request to an IP protocol and returns the request to the interfacing apparatus. Interfacing apparatus may alternately comprise RAS and/or GGSN (Gateway GPRS Support Node) functionality. In an alternate preferred embodiment interfacing apparatus 300 comprises telephony protocol converter for converting a preliminary data request with a CSD transport IP protocol to local area network (I,AN) IP protocol. The above applies to similar embodiments described below.

Figure 4:
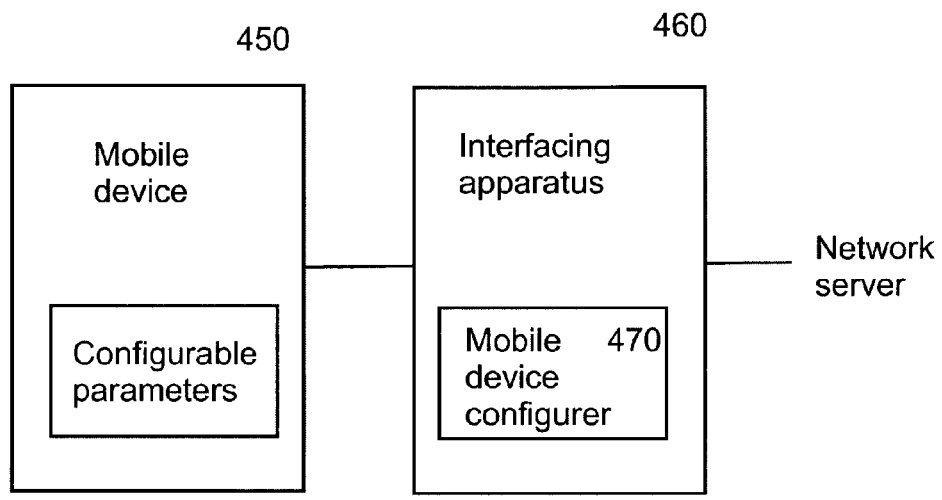
FIG. 4 shows a preferred embodiment of an interfacing apparatus with a mobile device configurer.

Reference is now made to FIG. 4, which shows a preferred embodiment of an interfacing apparatus with a mobile device configurer. In the preferred embodiment, the interfacing apparatus 460 further comprises a mobile device configurer 470 for configuring mobile telephony devices. Typically, a mobile device memory contains configurable parameters that ensure that a call is processed correctly by both the home and visited networks. Mobile device configurer 470 remotely configures the values of parameters within the mobile device. In the preferred embodiment, the mobile device configurer configures the device with an access code for directing data requests to the interfacing apparatus 460. The access code may comprise one of a group including: a WAP short code, an APN, a country code, a corporate code, an identity based code, and a network address.

A mobile phone user logging to a data service is often automatically logged on to a homepage preconfigured in the mobile device. The preconfigured homepage may not be suitable for a roaming user located outside the home network. For example, local time, weather, entertainment, and other services may be irrelevant. The user, however, may still require access to some local services such as email, and corporate sites. As described below, a visitor portal may provide a roaming mobile device with access to these services.

In the preferred embodiment the interfacing apparatus further comprises a visitor portal operable to connect the mobile device to a visitor portal page associated with the device. The mobile device may be connected to the visitor portal when a data session is initiated. The visitor portal page contains links to sites relevant to a specific user of a mobile device, from a specific home mobile network, visiting a specific visited mobile network.

In a first preferred embodiment the visitor portal is a part of an interfacing apparatus. A second preferred embodiment comprises a stand-alone visitor portal, where the mobile device accesses a mobile network and is directed to the visitor portal by the Mobile network. The mobile network may direct all roaming users automatically to the visitor portal, or the mobile device may dial a special access code to reach the visitor portal. In the stand-alone embodiment, the visitor portal can provide support to all types of roaming mobile devices, including both CSD and GPRS devices.

Figure 5:
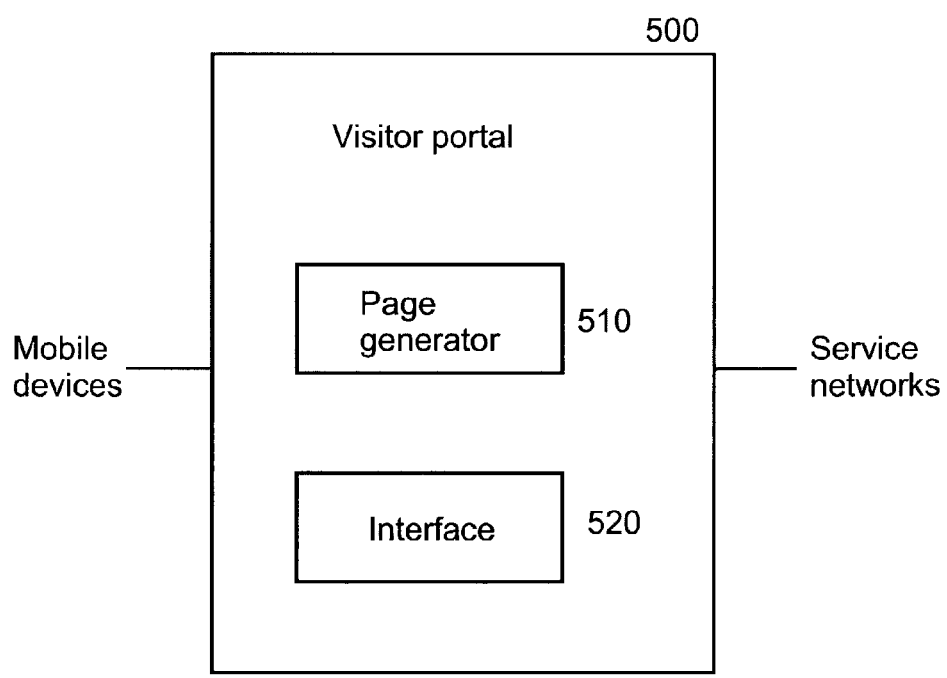
FIG. 5 is a simplified block diagram of a preferred embodiment of a visitor portal.

Reference is now made to FIG. 5, which is a simplified block diagram of a preferred embodiment of a visitor portal 500. Visitor portal 500 comprises page generator 510 which generates the visitor portal pages, and interface 520 which directs each mobile device to the device's visitor page.

The visitor portal 500 generates a visitor portal page for the specific mobile device, taking into account a number of factors. These factors may include: the device service profile, the device's current location, the visited network, the location of the visited network, the device's home network, etc. The device location may be determined from a number of factors, including the visited network location, and/or the identity of an interfacing apparatus providing service to the mobile device. The service profile may contain a user profile and/or community profiles associated with the device. In the preferred embodiment, the visitor portal page contains links to at least one of a group comprising: bookmarks, a mobile device home page, a home network page, a visited mobile network page, a location based page, an Internet access page, a corporate access page, a search engine, and an e-mail service. The bookmarks may be dynamically chosen by the subscriber, and may include data services requested by the mobile device. In a preferred embodiment, the visitor pages are generated from one or more templates stored in the visitor portal. The device specific information is inserted into a template to create a visitor template appropriate for a given device.

The visitor portal 500 can tailor the visitor portal page associated with each mobile device in order to suit needs of every type of roaming user, such as private users, small office/home office (SOHO) users, and corporate users requiring access to WAP enabled (and WAP compatible) corporate applications. The visitor portal 500 can also tailor the visitor portal page according to user community affiliations. Advertising and other riser and community oriented notices can be inserted into the visitor portal page generated for each device. The visitor portal 500 preferably provides users with seamless service to their WAP phones without requiring any change of phone setup.

In the preferred application the visitor portal page generated for private and SOHO users may contain links to the user's home page in the home network, a VPMN related visitor page (preferably in the travelers native language), bookmarks, and Internet access. Corporate users may be additionally provided access to a corporate portal. The visitor portal page content is composed of various data sources collected and integrated by the interfacing apparatus and the visitor portal 500. The interfacing apparatus may provide the visitor portal 500 with network addresses required for generating a visitor portal page for a mobile device.

The network address of the mobile device's home page may be determinable from the configuration of the mobile phone. If the home page server resides in the home network, the session is transferred to the HPMN by the interfacing apparatus If the home page resides on the Web, the data session is routed to the Internet by the interfacing apparatus to avoid a tromboning scenario.

The visitor network page may be a local site targeted for visitors, chosen by the visited network as a portal for traveler information service. The visitor network page can be in the domain of the visited network or on the Internet, and may be provided and maintained by the VPMN or by local partners. In the preferred embodiment, the visitor portal 500 obtains the network address from the visited network, and maintains it in a database. The database may also contain an identification of the visitor's preferred language, with the default determined by the MSISDN. The home network may have a corresponding page for its roaming users.

In the preferred embodiment, the mobile device is provided with Internet access through an ISP in either the visited or home mobile networks, or by routing through the interfacing apparatus.

The visitor portal 500 provides the corporate/VPN user with access to corporate resources through the interfacing apparatus. For a corporate private network accessible via the home network, the session is routed by the interfacing apparatus to the home network as described above. In the case of a global corporation with a worldwide presence, the interfacing apparatus may connect the mobile device to the nearest and/or fastest entry point into the corporate VPN. Access to a corporate network can be via the Internet or a dedicated corporate link. For secure corporate WAP applications, access may be through a private WAP gateway. The visitor portal database may store the VPN/corporate network address (URL), connection type, and the nature of the user's association with the network.

In a preferred embodiment the interfacing apparatus database is operable to exchange information with databases of supporting interfaces within other mobile networks. Likewise, in a further preferred embodiment the visitor portal database is operable to exchange information with databases of visitor portals in supporting interfaces within other mobile networks.

The visitor portal 500 may also perform an introduction process, similar to the one described above for the interfacing apparatus. The visitor portal 500 may comprise introducer functionality of its own, or may utilize the introducer in the interfacing apparatus. The above applies to similar embodiments described below.

Figure 6:
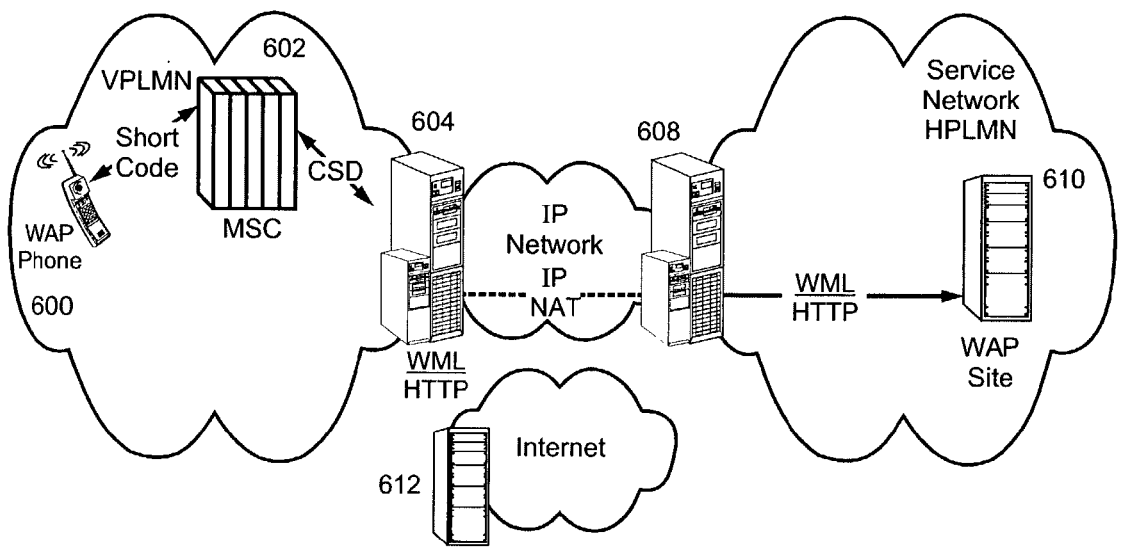
FIG. 6 is a simplified block diagram of a preferred embodiment of a WAP/CSD roaming scenario with, an interfacing apparatus.

Reference is now made to FIG. 6 which is a simplified block diagram of a preferred embodiment of a WAP/CSD roaming scenario with an interfacing apparatus as described above. In the embodiment of FIG. 6, an interfacing apparatus is located in both the VPMN (interfacing apparatus 604) and the Service network/HPMN (interfacing apparatus 608) linked by an IP network. For the remainder of the description of FIG. 6 Service network/HPMN will be assumed to be the HPMN.

Initiating the data request, WAP phone 600 dials a WAP short code, which is configured as its dial-up number. The VPMN mobile network is configured to route the packets from WAP phone 600 through the interfacing apparatus 604. Accordingly, MSC 602 connects non-home mobile devices dialing the short code number to interfacing apparatus 604. Interfacing apparatus 604 allocates a local private IP address to both the WAP gateway and user agent, and terminates the CSD leg.

Interfacing apparatus 604 converts the call protocol for CSD to IP protocol, and creates a different, IP based, preferably using the standard HTTP 1.1 protocol. The WAP phone 600 does not automatically connect the interfacing apparatus 604 to the WAP proxy in WAP phone's home network. Instead, the interfacing apparatus 604 analyzes the call from the WAP phone 600, determines the device identity and required data services, and then uses the information to determine a data service network according to the device service profile. The interfacing apparatus 604 then connects the WAP phone 600 directly to the URL of the data service network server, and manages data communications between the device and the service network until the device exits the data service. Alternately, the mobile device may be connected to a visitor portal, as described above, with the requested data service listed as a link in the visitor portal page.

Since the WAP gateway in the HPMN may be bypassed during some data communication, in the preferred embodiment interfacing apparatus 604 additionally performs other WAP gateway functions required for proper data communications. Specifically, interfacing apparatus 604 comprises a protocol converter for converting between WTP and HTTP. In case of a secured WAP site (WTLS) the WAP router will not convert the packets if the site specifically requires conversion by a local gateway, and only the routing and/or NAT capabilities of the interfacing apparatus 604 are used.

In the preferred embodiment, the interfacing apparatus 604 additionally comprises a quality of service manager and billing manager.

In order to access home services, the user of the roaming mobile device must be able to access the HPMN IP backbone. The interfacing apparatus 604 embedded NAT capabilities eliminate the match-up problem of different private IP domains and addresses of various operators. Interfacing apparatus 604 analyzes parameters received with the incoming WAP/CSD call to determine the required HPMN. Such parameters include the CLI obtained from the RAS functionality in interfacing apparatus 604. When WAP phone 600 sends a data request to a data service on the HPMN, interfacing apparatus 604 performs NAT to translate the originating address of the data request to the home network address of the WAP phone. Data services on the HPMN therefore identify the WAP phone correctly.

In the preferred embodiment, if the upper level application is not WAP (for example GSM modem), or is targeted to a secured site, the interfacing apparatus 604 operates as a simple router.

The architecture illustrated in FIG. 6 is backward compatible with any existing WAP infrastructure at the HPMN, regardless of the WAP gateway vendor. Even if the WAP gateway at the HPMN is implemented as a proxy, and a user wants to access home services, the session can bypass the HPMN WAP gateway because the WAP conversion is performed at the HPMN. and therefore continues as a regular IP session in the HPMN.

In the preferred embodiment, the mobile device is configured to direct roaming data communications to a preselected interfacing apparatus, which operates substantially as the interfaces described above. The mobile device is associated with a service profile which specifcs service networks providing data services to the device. The device configuration may be entered when the device is manufactured, by a distributor of the device, or when the device accesses to a network. In the preferred embodiment the device is remotely configurable. For example, a roaming device logging on to a visited network may be remotely configured with an access code. In the preferred embodiment the device configuration includes a predetermined access code, such as a predetermined access address, a predetermined APN, a WAP short code, a country code, a corporate code, an identity based code, or a network code. Transmission of the data request with the access code ensures that the mobile network identifies the data request as a roaming data request, and directs the data request to the interfacing apparatus.

Figure 7:
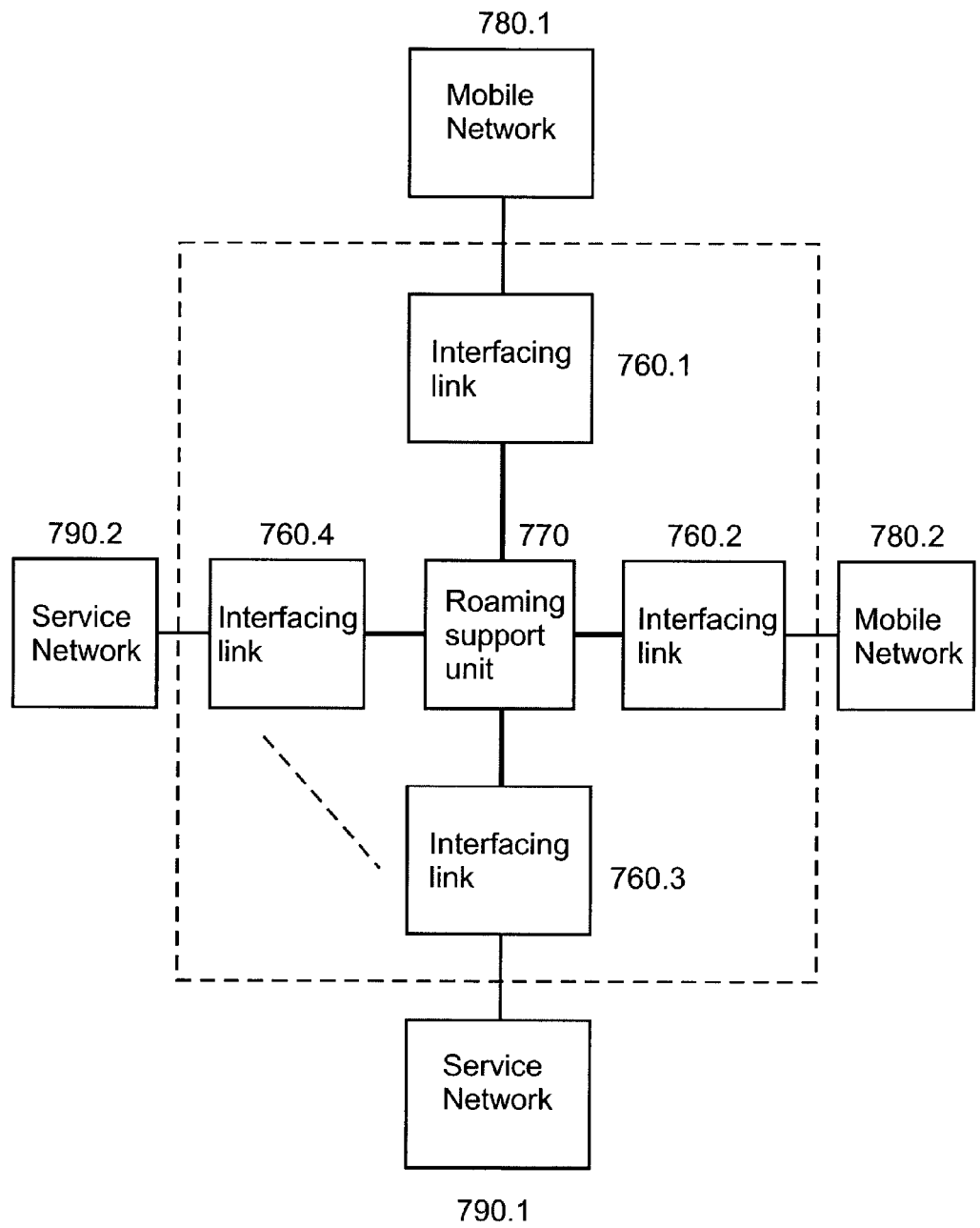
FIG. 7 is a simplified block diagram of a preferred embodiment of a network for supporting roaming of mobile communication devices between a plurality of mobile networks.

Reference is now made to FIG. 7 which is a simplified block diagram of a preferred embodiment of a network for supporting roaming of mobile communication devices between at least one mobile network and at least one service network providing data services. Each of the mobile communication devices has a respective home network. Network 750 comprises interfacing links 760.1 to 760.n, and a roaming support unit 770 associated with the interfacing links. Each of the mobile networks, 780.1 to 780.n, and each of the service networks, 790.1 to 790.n, is associated with a respective interfacing link. Mobile networks may function as service networks, and provide data services to mobile devices. The number of interfacing links, service networks, and mobile networks in the figure is for illustration purposes only, and may comprise any number greater than one.

The roaming support unit 770 provides data regarding the roaming mobile devices to a respective interfacing link. In a preferred embodiment the network further comprises a database for storing properties associated with the mobile devices, such as the device service profiles. In a further preferred embodiment the database is operable to store the home data.

Figure 8:
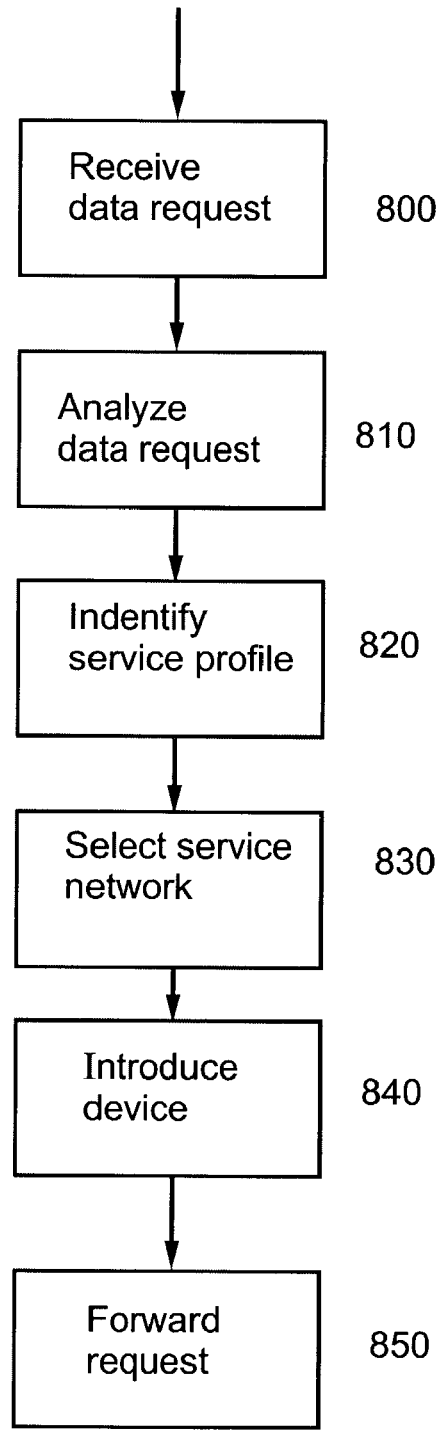
FIG. 8 is simplified flow chart of a preferred embodiment of a method for supporting cellular data communication between a mobile telephony device roaming within a visited mobile network, and a data service.

Reference is now made to FIG. 8 which is a simplified flow chart of a preferred embodiment of a method for supporting cellular data communication between a mobile telephony device roaming within a visited mobile network and a data service. The mobile device is associated with a home network and a service profile. In step 800 a data request for a data service is received from the mobile device. The data request designates a requested data service. Data services include: commercial services, emergency services, email, native language customer assistance, global short code access, bookmark access, and short message service. These data services may be provided by a plurality of networks. The data request protocol may comprise WAP data, standard data, or secure data. The data request is analyzed in step 810, to determine the required data service and to identify the mobile device which sent the request. In step 820, the service profile of the requesting device is identified. The device's service profile is used to select a service network corresponding to the required data service in step 830. In step 840 the mobile device is introduced to the service network. Finally, in step 850 the data request is forwarded to the service network. Thus the data request is forwarded directly to the service network, and need not be routed through the device home network unless the data service network server is located within the home network. Forwarding data responses from the service network to the mobile device is handled in an analogous manner. The data service may be provided by the home network, the visited network, or any other accessible network. The requested data service server may be located within the Internet, a corporate network, or a private network.

In a preferred embodiment, the identity of the mobile device is determined from at least one parameter received with the data request. The device identity may be determined from at least one of the following parameters: MSISDN, mobile device home page, APN, and CLI.

Network address translation may also be performed as necessary to facilitate data communication between the mobile device and the data service network server. A preferred embodiment further comprises determining a service network address assigned to the mobile device by the service network. If the assigned service network address is a private network address, network address translation may be required. A preferred embodiment further comprises determining if the service network address comprises a private network address, and performing network address translation if the service network address is private, to translate the originating network address of the data request from the device's visited network address the device's service network address.

In a preferred embodiment performing network address translation comprises the steps of: determining the visited network address, determining the service network address, and replacing the originating network address of the data request with the service network address.

In a preferred embodiment performing network address translation comprises the steps of determining the visited network address, determining the service network address, and replacing a destination network address of the data request with the visited network address.

In a preferred embodiment, the method further comprises identifying a service network authorization server of the mobile device, such as a Radius server. Another preferred embodiment further comprises querying the service network authorization server to authorize the data request by the mobile device. Another preferred embodiment comprises identifying a home network and/or home network authorization server. The device home network may be identified from the device service profile, or from parameters received with data requests from the mobile device, such as CLI, APN, mobile device home page, and MSISDN. The home authorization server may be queried to authenticate the mobile device. The home network and/or service network may be queried only during initiation of a data session.

In a preferred embodiment, the method comprises allocating a visited network address to the mobile device.

In a preferred embodiment, the method comprises maintaining a visitor database for storing properties associated with the mobile device. The properties stored in the database may include: service profile, visited network name, visited network location, service network address, home network address, visited network address, community profiles, and a user profile. The user profile may be part of the service profile, and may specify user information and data service preferences. The data stored in the database may be used during other steps of the method. For example, the service profile; device network addresses, and home network may determined from the database.

In a preferred embodiment, the method comprises creating and/or terminating a data communication session for the mobile device.

In a preferred embodiment the method comprises routing the data communication. In another preferred embodiment, the method comprises managing quality of service and/or billing.

In a preferred embodiment, the method comprises converting a data request having an incompatible protocol into a predetermined network protocol. For example, the request protocol may be converted between WTP and HTTP. A further preferred embodiment comprises rerouting a preliminary data request having a mobile telephony protocol to a mobile telephony node operable to convert the preliminary data request into a data request having a predetermined network protocol and to return the data request to the data interface.

In a preferred embodiment, the method comprises connecting the mobile device to a visitor portal page associated with the mobile device. The device may be connected to the visitor portal page when the device initiates a data session. The preferred embodiment further comprises generating the visitor portal page associated with each device. The visitor portal page generated for each device may vary depending upon the mobile phone location, the identity of the home and visited mobile networks, a service profile associated with the mobile device, and other factors. The visitor portal page may contain links to a variety of pages and services, such as: a mobile device home page, a home network page, a first mobile network page, a location based page, an Internet access page, a corporate access page, a search engine, and an e-mail service.

In a preferred embodiment, the method comprises configuring the mobile device,

The above-described embodiments address the difficulties currently facing WAP data users. Users of mobile telephones are efficiently connected to data services within the visited and home mobile networks, or elsewhere within the data network. Network servers preferably provide relevant, localized data, while still allowing seamless access to corporate servers. CSD data users are routed efficiently to the data service network. GPRS subscribers are provided with simple access to a wide range of data services. Subscribers enjoy seamless access to all portals and bookmarks, along with local information and corporate intranet access for VPN members. The visitor portal provides both WAP/CSD and WAP/GPRS mobile operators with a way to tailor the services and information provided to the needs of each subscriber.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. A visitor portal at a roaming mobile network for supporting data communication from roaming mobile telephony devices, said mobile telephony devices being associated with respective home networks and with respective service profiles, and being able to roam non-home networks, said visitor portal comprising:
   a page provider at a respective roaming mobile network, being configured to retrieve a respective service profile from said home network and further configured to use said service profile to provide a visitor portal page customized for a respective roaming mobile telephony device roaming at said respective roaming mobile network, using said service profile; and
   an interface configured to direct said respective mobile telephony device to said customized visitor portal page at said roaming mobile network, thereby to support data communication according to said service profile for said roaming mobile telephony device.

2. A visitor portal according to claim 1, wherein at least some of said service profiles comprise a user profile.

3. A visitor portal according to claim 2, wherein a user profile comprises user specified data service networks.

4. A visitor portal according to claim 1, wherein a non-home network being roamed by a mobile telephony device is operable to connect said mobile telephony device to said visitor portal.

5. A visitor portal according to claim 4, wherein said non-home network is operable to connect said mobile telephony device to said visitor portal upon initiation of a data session by said mobile telephony device.

6. A visitor portal according to claim 1, wherein said mobile device comprises one of a group of devices comprising: WAP (Wireless Application Protocol), MHTML (MIME (Multipurpose Internet Mail Extensions) Hyper Text Markup Language), CHTML (C (Compact) Hypertext Markup Language), and SHTML (S (Server Side Includes) Hyper Text Markup Language) devices.

7. A visitor portal according to claim 1, wherein said mobile devices are operable to perform CSD (Circuit Switched Data) communication.

8. A visitor portal according to claim 1, wherein said mobile devices are operable to perform GPRS (General Packet Radio Service) communication.

9. A visitor portal according to claim 1, wherein a portal page comprises at least one link to a service network.

10. A visitor portal according to claim 1, wherein said page provider is operable to provide said respective visitor portal page in accordance with a current location of said device.

11. A visitor portal according to claim 10, wherein said current location is determined by parameters associated with a non-home network being roamed by said mobile telephony device.

12. A visitor portal according to claim 1, wherein said page provider is operable to provide said respective visitor portal page in accordance with a non-home network being roamed by said mobile telephony device.

13. A visitor portal according to claim 1, wherein said page provider is operable to provide said respective visitor portal page in accordance with said home network associated with said device.

14. A visitor portal according to claim 1, wherein said visitor portal page contains links to at least one of a group comprising: bookmark requests, a non-home user page, a mobile device home page, a home network page, a location based page, an Internet access page, a corporate access page, a search engine, and an e-mail service.

15. A visitor portal according to claim 1, comprising at least one visitor page template, and wherein said page provider is operable to provide a visitor portal page by insertion of information associated with a mobile device into one of said templates.

16. A system for supporting roaming data communication, said system comprising a network having home mobile device users and non-home mobile device users and a visitor portal at a mobile roaming network for non-home users, said non-home users having respective user profiles at their home networks, said system being operable to connect a non-home user to said visitor portal at said roaming mobile network, said visitor portal at said roaming mobile network configured to extract said user profile from a corresponding home network and to use said user profile to provide said non-home user with a portal page at said roaming mobile network to appear on a screen of a respective mobile device therethrough to provide access to services according to said user service profile.

17. A system for supporting roaming data communication according to claim 16, wherein said network comprises said visitor portal.

18. A system for supporting roaming data communication according to claim 16, wherein said system is operable to connect said non-home user to said visitor portal upon initiation of a data session by said user.

19. A system for supporting roaming data communication according to claim 16, wherein said visitor portal is operable to direct said non-home user to a visitor portal page associated with said device.

20. A system for supporting roaming data communication according to claim 19, said visitor portal comprising:
　a page generator for generating for said visitor portal pages; and
　an interface for directing said non-home user to said associated visitor portal page.

21. A system for supporting roaming data communication according to claim 20, wherein said page generator is operable to generate said associated visitor portal page in accordance with a current location of said device.

22. A system for supporting roaming data communication according to claim 21, wherein said current location is determined by parameters associated with said first mobile network.

23. A system for supporting roaming data communication according to claim 20, wherein said page generator is operable to generate said associated visitor portal page in accordance with said home network of said device.

24. A system for supporting roaming data communication according to claim 20, wherein said page generator is operable to generate said associated visitor portal page in accordance with a user profile associated with said device.

25. A system for roaming data communication according to claim 19, wherein said visitor portal page contains links to at least one of a group comprising: a non-home user page, a mobile device home page, a home network page, a location based page, an Internet access page, a corporate access page, a search engine, and an e-mail service.

26. A support network for supporting roaming of cellular communication devices in at least a first cellular network, each of said cellular communication devices having a respective home cellular network being other than said first cellular network, and there being at least one service network configured to provide data services between said at least first and said home cellular networks, said support network comprising:
　interfacing links to each of said cellular networks and each of said service networks; and
　a roaming support unit associated with said interfacing links configured to provide home data of roaming devices stored at said respective home network over said service network to a respective interfacing link of said first cellular network, said home data including a respective service profile retrieved from said home network usable to provide a roaming user with a visitor portal page at a respective roaming mobile network, said visitor portal page being customized for a respective roaming mobile telephony device of said roaming user using said service profile.

27. A network for supporting roaming of cellular communication devices according to claim 26, further comprising a database for storing properties associated with said cellular devices.

28. A network for supporting roaming of cellular communication devices according to claim 27, wherein said database is further operable to store said home data.

* * * * *

UNITED STATES PATENT AND TRADEMARK OFFICE
CERTIFICATE OF CORRECTION

| | |
|---|---|
| PATENT NO. | : 7,184,764 B2 |
| APPLICATION NO. | : 10/067536 |
| DATED | : February 27, 2007 |
| INVENTOR(S) | : Li-On Raviv et al. |

Page 1 of 1

It is certified that error appears in the above-identified patent and that said Letters Patent is hereby corrected as shown below:

Priority Data:

On the Title page, insert in the section marked

Item [63]   Related U.S. Application Data please add

--US Application No. 60/267,187 filed on February 8, 2001--

Signed and Sealed this

Eighteenth Day of September, 2007

JON W. DUDAS
*Director of the United States Patent and Trademark Office*